United States Patent
Patel et al.

(10) Patent No.: US 10,140,680 B2
(45) Date of Patent: Nov. 27, 2018

(54) HARDWARE-ACCELERATED RESOURCE TILING

(71) Applicant: Microsoft Technology Licensing, LLC, Redmond, WA (US)

(72) Inventors: Amar Patel, Kirkland, WA (US); Matt Lee, Sammamish, WA (US); William Kristiansen, Duvall, WA (US); Chas Boyd, Woodinville, WA (US); Matthew Sandy, Redmond, WA (US); Allison Klein, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/916,594

(22) Filed: Jun. 13, 2013

(65) Prior Publication Data

US 2014/0368523 A1    Dec. 18, 2014

(51) Int. Cl.
*G06T 1/60*    (2006.01)
*G06T 15/04*    (2011.01)
*G06T 15/00*    (2011.01)
*G06F 12/0875*    (2016.01)
*G09G 5/393*    (2006.01)

(52) U.S. Cl.
CPC .......... *G06T 1/60* (2013.01); *G06F 12/0875* (2013.01); *G06T 15/005* (2013.01); *G06T 15/04* (2013.01); *G09G 5/393* (2013.01)

(58) Field of Classification Search
CPC ..... G06T 1/60; G06T 15/005; G06F 12/0875; G09G 5/39; G09G 5/393
See application file for complete search history.

(56) References Cited

U.S. PATENT DOCUMENTS

| | | | |
|---|---|---|---|
| 6,373,482 B1 | 4/2002 | Migdel et al. | |
| 6,618,053 B1 | 9/2003 | Tanner | |
| 6,636,941 B1* | 10/2003 | Gold et al. | 711/112 |
| 6,856,320 B1 | 2/2005 | Rubinstein et al. | |
| 7,102,646 B1 | 9/2006 | Rubinstein et al. | |
| 7,188,228 B1* | 3/2007 | Chang et al. | 711/202 |
| 7,626,591 B2 | 12/2009 | Crawfis et al. | |
| 8,300,059 B2 | 10/2012 | Isidoro et al. | |
| 2004/0128469 A1 | 7/2004 | Hall et al. | |
| 2006/0107023 A1* | 5/2006 | Johnson | G06F 12/10 711/206 |
| 2009/0204784 A1 | 8/2009 | Favergeon-Borgialli et al. | |

(Continued)

OTHER PUBLICATIONS

"MegaTexture", Retrieved at «http://en.wikipedia.org/wiki/MegaTexture», Dec. 15, 2005, pp. 2.

(Continued)

*Primary Examiner* — Saptarshi Mazumder
(74) *Attorney, Agent, or Firm* — Arent Fox LLP (57) ABSTRACT

In one embodiment, a graphics processing unit 170 may support a logical resource using a physical tile pool 350 for sparse data sets. The graphics processing unit 170 may allocate a physical memory allocation into a primary physical tile pool 350. The graphics processing unit 170 may define a mapping for a logical tile set 300 for a logical resource. The graphics processing unit 170 may selectively map a primary logical tile 320 of the logical tile set 300 to a primary physical tile 360 of the primary physical tile pool 350.

17 Claims, 10 Drawing Sheets (56) References Cited

U.S. PATENT DOCUMENTS

| 2010/0182323 | A1 | 7/2010 | Nuydens |
| 2012/0038657 | A1* | 2/2012 | Grossman et al. ............ 345/585 |
| 2013/0067502 | A1 | 3/2013 | Blanco et al. |

OTHER PUBLICATIONS

"International Search Report & Written Opinion for PCT Patent Application No. PCT/US2013/060770", dated Mar. 3, 2014, Filed Date: Sep. 20, 2013, 11 Pages.

Parmelee, et al., "Virtual Storage and Virtual Machine Concepts", In IBM Systems Journal, vol. 11, Issue 2, Jan. 1, 1972, pp. 99-130.

Denning, Peter J., "Virtual Memory", In ACM Computing Surveys, vol. 2, Issue 3, Sep. 1, 1970, pp. 153-189.

Denning, Peter J., "Anecdotes: Origin of Virtual Machines and Other Virtualities", In IEEE Annals of the History of Computing, vol. 23, Issue 3, Jul. 2001, p. 73.

Fotheringham, John, "Dynamic Storage Allocation in the Atlas Computer, Including an Automatic Use of a Backing Store", In Communications of the ACM, vol. 4, Issue 10, Oct. 1, 1961, pp. 435-436.

Kilburn, et al., "One-Level Storage System", In IRE Transactions on Electronic Computers, vol. EC-11, Issue 2, Apr. 1, 1962, pp. 223-235.

McCormack, et al., "Virtual-Memory Tiling for Spatial Data Handling in GIS", Published in Computers and Geosciences, vol. 23, Issue 6, Jul. 1, 1997, pp. 659-669.

Franklin, James, "Tiled Virtual Memory for UNIX", In Proceedings of USENIX Summer 1992 Technical Conference, Jun. 8, 1992, pp. 99-106.

Patterson, et al., "Chapter 5—Large and Fast: Exploiting Memory Hierarchy", In Book—Computer Organization and Design: The Hardware/Software Interface, 4th Edition, A Morgan Kaufmann Publication, Nov. 10, 2008, 119 Pages.

* cited by examiner

HARDWARE-ACCELERATED RESOURCE TILING

BACKGROUND

A hardware-accelerated game or application may display large surfaces of content. For example, a user interface may have a scrollable interface or a game may have a large terrain environment. In these cases, the software application may benefit from being able to utilize a continuous representation of the content. Typically, reserving space in physical memory for the entire surface may be impractical, with just a small fraction of the terrain visible at any given time.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Embodiments discussed below relate to supporting a logical resource using a physical tile pool for sparse data sets. The graphics processing unit may allocate a physical memory allocation into a primary physical tile pool. The graphics processing unit may define mapping for a logical tile set for a logical resource. The graphics processing unit may selectively map a primary logical tile of the logical tile set to a primary physical tile of the primary physical tile pool.

DRAWINGS

In order to describe the manner in which the above-recited and other advantages and features can be obtained, a more particular description is set forth and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

DETAILED DESCRIPTION

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure. The implementations may be a machine-implemented method, a tangible machine-readable medium having a set of instructions detailing a method stored thereon for at least one processor, or a graphics processing unit.

An application may create a physical tile pool that represents a physical memory allocation of a graphics processing unit. The application may also define a tiled logical resource, without physical memory allocation for the contents. Instead, an application may selectively map individual tiles of the logical resource so that certain logical tiles are associated with physical tiles in the physical tile pool. By selectively mapping the logical tiles to the physical tiles, the application may avoid a direct one-to-one mapping for each logical tile to a physical tile. Multiple logical tiles may be mapped to the same physical tile. Additionally, a logical tile may be "null-mapped", or unassociated with a physical tile. By default, a logical tile may be "null-mapped" until assigned to a physical tile. An application may selectively map multiple tiles from multiple logical resources to the same physical tile, and may selectively map multiple tiles from the same logical resource to multiple physical tiles in distinct tile pools.

When accessing a region of the logical resource to perform a read or write operation, the graphics processing unit may ensure that operations that affect the contents of multiple physical tiles may be correctly handled, producing no "seams" between tiles. For operations that access null-mapped tiles, the graphics processing unit may set a flag in hardware code on the operation. The graphics processing unit may treat the null-mapped tile as a mapped tile containing a well-defined value such as zero. An application using the tile may use the flag to determine when a miss has occurred. Then, the application may seek an alternate way to substitute the missing data, such as queuing a task to load data in the missing area for future accesses.

The physical tile pool may be a software abstraction that enables an application to effectively program a page table on the graphics processing unit without knowing the low level implementation details, such as pointer addresses. A physical tile pool may forgo applying any additional levels of indirection in hardware. Logical tiles of the same logical tile set may be mapped to different physical tile pools. Alternately, the physical tile pool may be resized to accommodate more physical tiles.

Thus, in one embodiment, a graphics processing unit may support a logical resource using a physical tile pool for sparse data sets. The graphics processing unit may allocate a physical memory allocation into a primary physical tile pool. The graphics processing unit may define a logical mapping for a logical tile set for a logical resource. The graphics processing unit may store a sparse data set referenced by the logical resource, such as a graphic texture data set. The graphics processing unit may selectively map a primary logical tile of the logical tile set to a primary physical tile of the primary physical tile pool.

Figure 1:
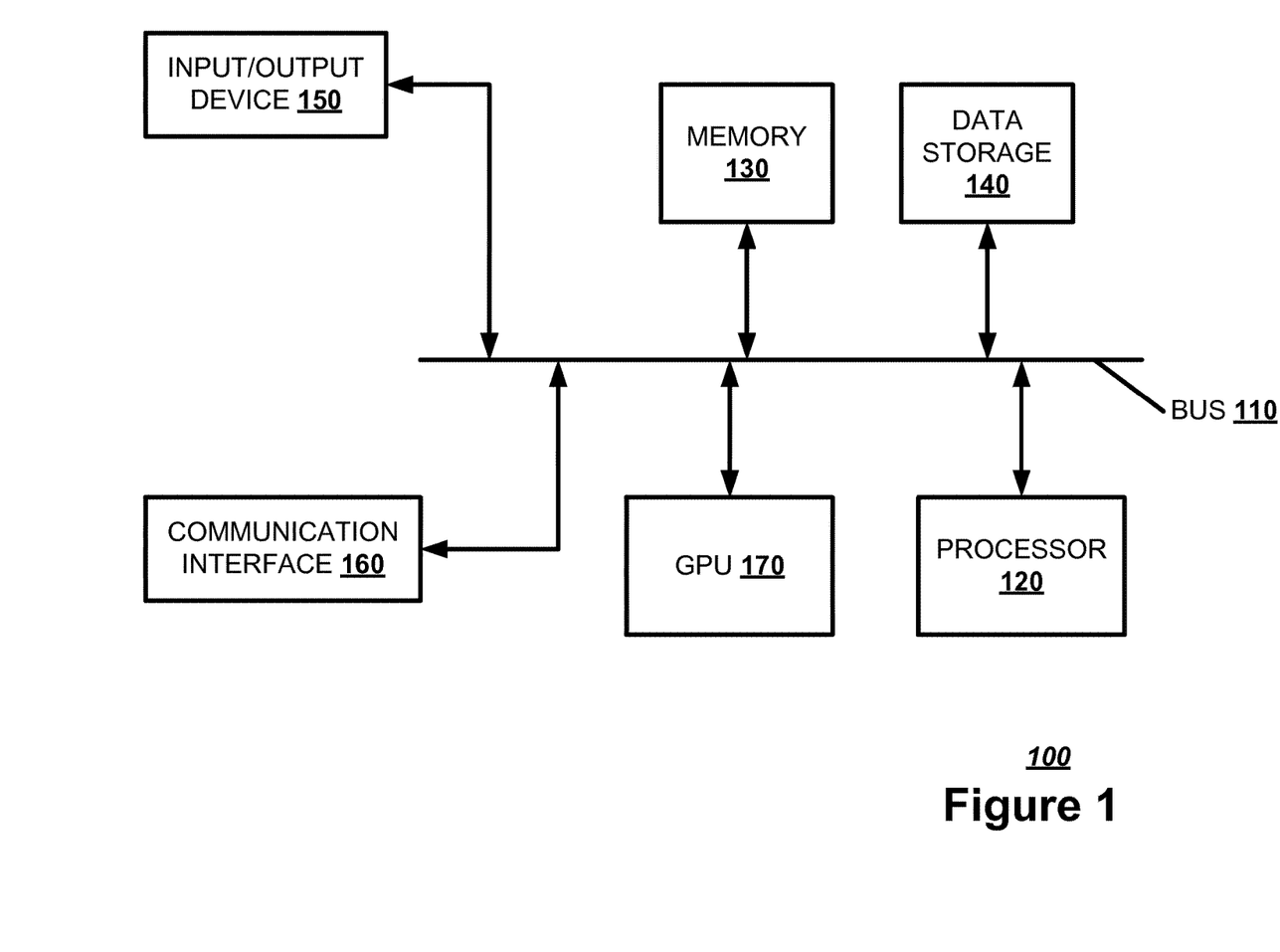
FIG. 1 illustrates, in a block diagram, one embodiment of a computing device.

FIG. 1 illustrates a block diagram of an exemplary computing device 100 which may act as graphical computing device. The computing device 100 may combine one or more of hardware, software, firmware, and system-on-a-chip technology to implement graphical computing device. The computing device 100 may include a bus 110, a processor 120, a memory 130, a data storage 140, an input/output device 150, a communication interface 160, and a graphics processing unit (GPU) 170. The bus 110, or other component interconnection, may permit communication among the components of the computing device 100.

The processor 120 may include at least one conventional processor or microprocessor that interprets and executes a set of instructions. The memory 130 may be a random access memory (RAM) or another type of dynamic data storage that stores information and instructions for execution by the processor 120. The memory 130 may also store temporary variables or other intermediate information used during execution of instructions by the processor 120. The data storage 140 may include a conventional ROM device or another type of static data storage that stores static information and instructions for the processor 120. The data storage 140 may include any type of tangible machine-readable medium, such as, for example, magnetic or optical recording media, such as a digital video disk, and its corresponding drive. A tangible machine-readable medium is a physical medium storing machine-readable code or instructions, as opposed to a signal. Having instructions stored on computer-readable media as described herein is distinguishable from having instructions propagated or transmitted, as the propagation transfers the instructions, versus stores the instructions such as can occur with a computer-readable medium having instructions stored thereon. Therefore, unless otherwise noted, references to computer-readable media/medium having instructions stored thereon, in this or an analogous form, references tangible media on which data may be stored or retained. The data storage 140 may store a set of instructions detailing a method that when executed by one or more processors cause the one or more processors to perform the method. The data storage 140 may also be a database or a database interface for storing graphic texture data.

The input/output device 150 may include one or more conventional mechanisms that permit a user to input information to the computing device 100, such as a keyboard, a mouse, a voice recognition device, a microphone, a headset, a gesture recognition device, a touch screen, etc. The input/output device 150 may include one or more conventional mechanisms that output information to the user, including a display, a printer, one or more speakers, a headset, or a medium, such as a memory, or a magnetic or optical disk and a corresponding disk drive. The communication interface 160 may include any transceiver-like mechanism that enables computing device 100 to communicate with other devices or networks. The communication interface 160 may include a network interface or a transceiver interface. The communication interface 160 may be a wireless, wired, or optical interface. A graphics processing unit 170 may be a specialized circuit that prepares graphics images for display by the computer.

The computing device 100 may perform such functions in response to processor 120 executing sequences of instructions contained in a computer-readable medium, such as, for example, the memory 130, a magnetic disk, or an optical disk. Such instructions may be read into the memory 130 from another computer-readable medium, such as the data storage 140, or from a separate device via the communication interface 160.

Figure 2:
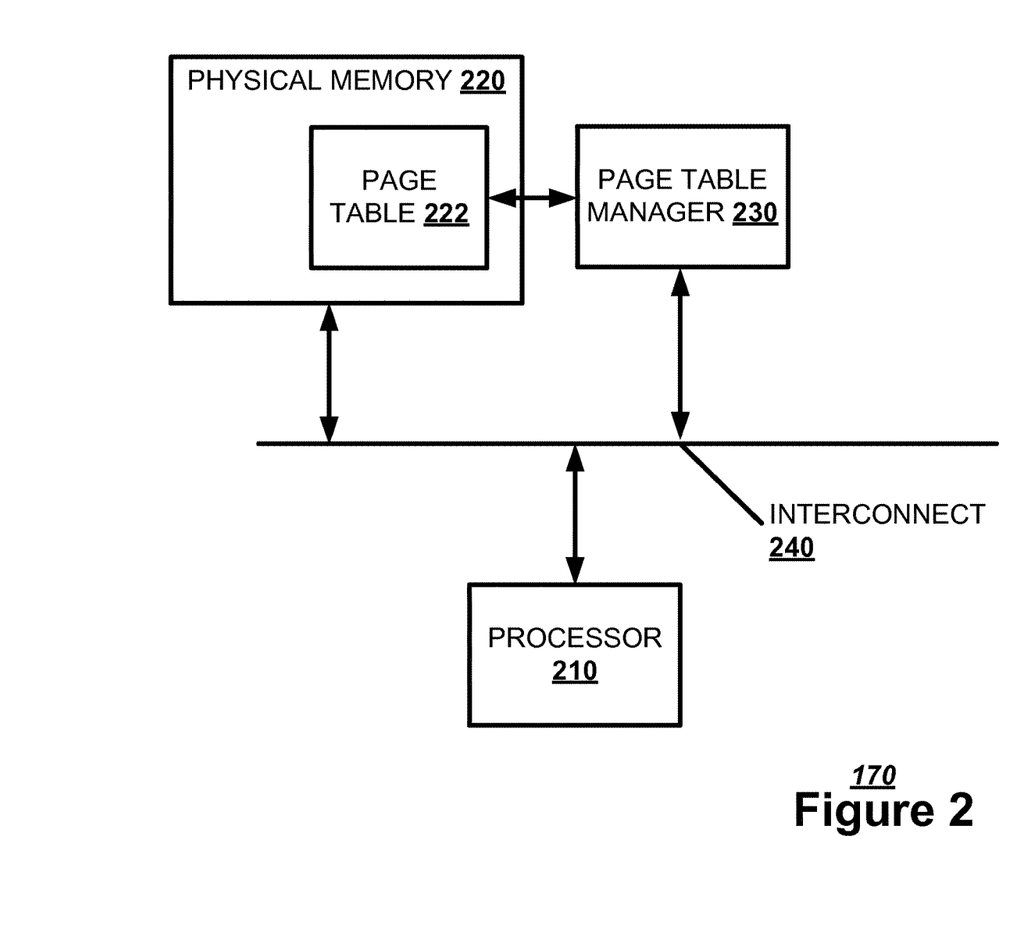
FIG. 2 illustrates, in a block diagram, one embodiment of a graphics processing unit.

FIG. 2 illustrates, in a block diagram, one embodiment of a graphics processing unit 170. The graphics processing unit 170 may have a processor 210, an internal physical memory 220, and a page table manager 230 that interact via a chip interconnect 240. The processor 210 may prepare a graphic texture data set for display by processing the graphic texture data set in virtual memory. The internal physical memory 220 may store the graphic texture data set in preparation for processing. A page table 222 may be allocated out of the internal physical memory 220, with the amount of internal physical memory 220 allocated based on the number of pages mapped. The page table 222 may map the virtual memory to the internal physical memory 220. A hardware page table manager 230 may manage the page table in the internal physical memory 220. Alternately, the page table manager 230 may be a logical function implemented by the processor 210.

Figure 3A:
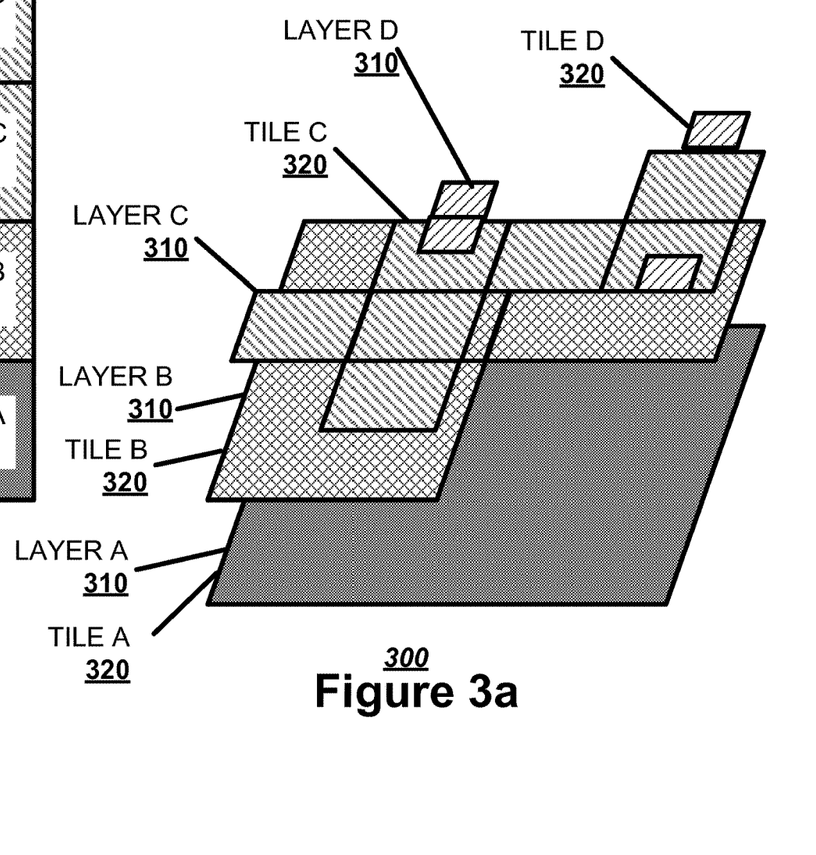
FIGS. 3a-b illustrate, in block diagrams, embodiments of tiled resources.

The graphic texture data set may be arranged as one or more "multum in parvo" (MIP)-maps divided into a set of tiles in virtual memory. A MIP-map is an optimized image that accompanies a main texture to increase rendering speed. FIG. 3a illustrates, in a block diagram, an embodiment of a MIP-map graphic texture data set stored as a logical tile set 300. The MIP-map graphic texture data set may have multiple layers 310 representing different levels of granularity based on the distance of a virtual observer from a graphic. Each layer 310 may be divided into one or more logical tiles 320.

For example, the graphic texture data set may have Layer A 310, Layer B 310, Layer C 310, and Layer D 310. Layer A 310 may have one logical tile A 320 with minimal textural detail for an observer distant from the graphic surface. Layer B 310 may have three logical tiles B 320 with slightly more textural detail for an observer less distant from the graphic surface. Layer C 310 may have seven logical tiles C 320 with more textural detail for an observer closer to the graphic surface. Layer D 310 may have four logical tiles D 320 with a great deal of textural detail for an observer close to the graphic surface. While a distant layer 310 may have less detail, the distant layer 310 may have to describe a greater area.

Figure 3B:
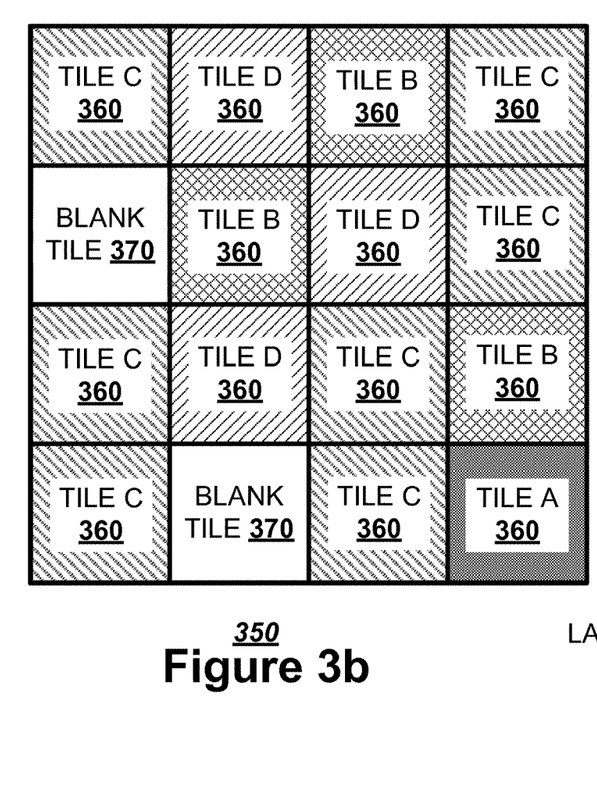

The physical memory 220 may be divided into one or more physical tile pools. FIG. 3b illustrates, in a block diagram, an embodiment of a MIP-map graphic texture data set mapped to a physical tile pool 350. The physical tile pool 350 may have one or more physical tiles 360. A logical tile 320 of the logical resource may be mapped to a physical tile 360. Until a logical tile 320 is mapped to the physical tile 360, a physical tile 360 may be a blank tile 370. Multiple logical tiles 320 may be mapped to a single physical tile 360. In the above example, the physical tile pool 350 may have one physical tile 360 mapped to one logical tile A 320, three physical tiles 360 mapped to three logical tiles B 320, seven physical tiles 360 mapped to seven logical tiles C 320, and three physical tiles 360 mapped to four logical tiles D 320.

Figure 4A:
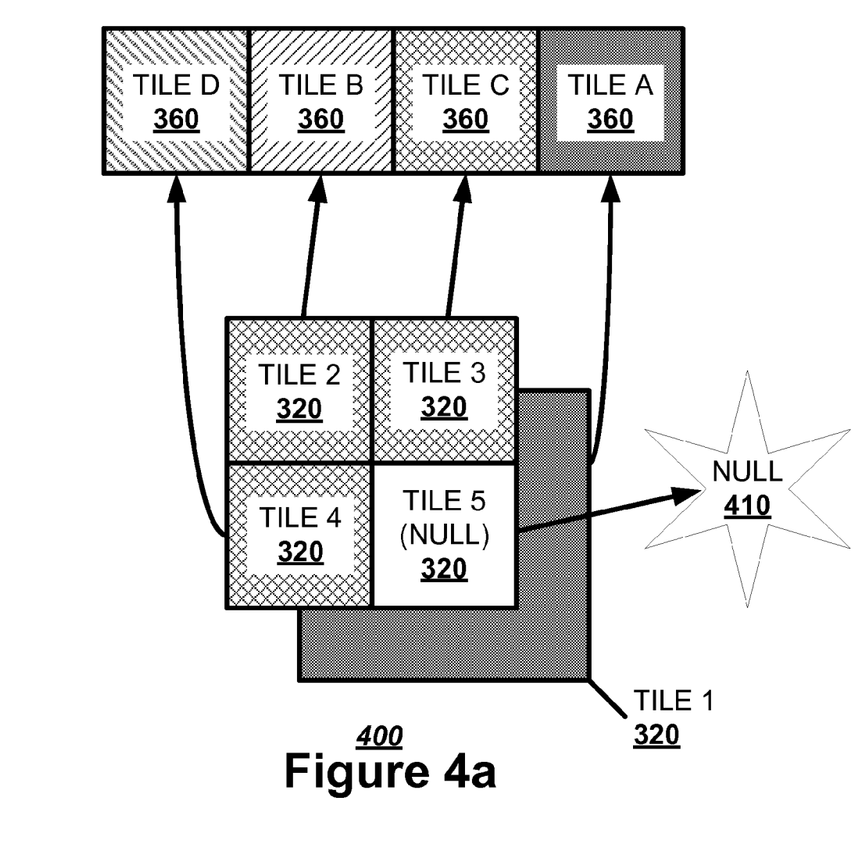
FIGS. 4a-b illustrate, in block diagrams, embodiments of resource mapping.

The logical tile set 300 may be mapped to the physical tile pool in multiple ways. FIG. 4a illustrates, in a block diagram, one embodiment of a first resource mapping 400. A logical tile 320 of the logical tile set 300 may be mapped to a physical tile 360 of the physical tile pool 350. For example, logical tile 1 320 may be mapped to physical tile A 360, logical tile 2 320 may be mapped to physical tile B 360, logical tile 3 320 may be mapped to physical tile C 360, and logical tile 4 320 may be mapped to physical tile D 360. Further, a logical tile 320, such as logical tile 5, may be a null-mapped logical tile 410, with no physical tile 360 representing the logical tile 320. A graphics processing unit 170 or an application software may interpret the null-mapped logical tile 410 as a neutral tile, such as a border color for a graphic texture data set. Alternately, upon encountering a null-mapped logical tile 410, the graphics processing unit 170 or the application software may fall back to a lower level MIP-map.

Figure 4B:
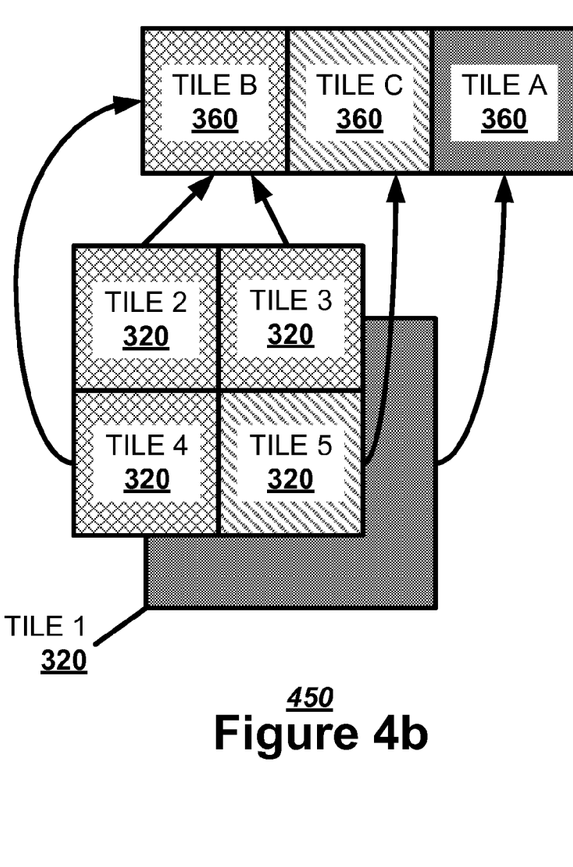

FIG. 4b illustrates, in a block diagram, one embodiment of a second resource mapping 450. Multiple logical tiles 320 of the logical tile set 300 may be mapped to a single physical tile 360 of the physical tile pool 350. The graphics processing unit 170 may make this mapping for repetitive logical tiles 320. For example, logical tile 1 320 may be mapped to physical tile A 360. Logical tile 2 320, logical tile 3 320, and logical tile 4 320 may be mapped to single physical tile B 360. Logical tile 5 320 may be mapped to physical tile C 360.

Figure 5:
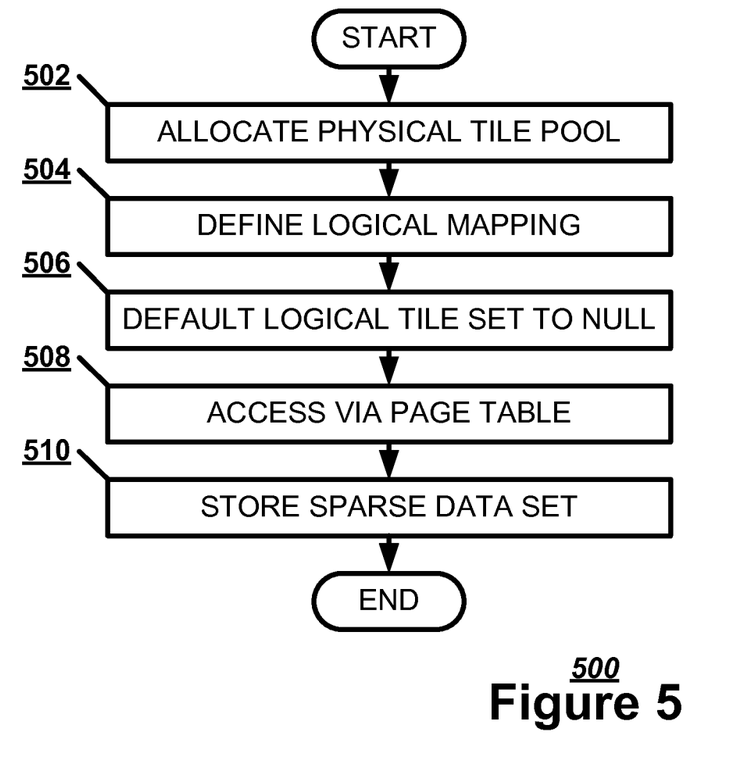
FIG. 5 illustrates, in a flowchart, one embodiment of a method of storing a sparse data set.

FIG. 5 illustrates, in a flowchart, one embodiment of a method 500 of storing a sparse data set. The graphics processing unit 170 may allocate a physical memory allocation into a primary physical tile pool 350 (Block 502). The graphics processing unit 170 may define a logical mapping for a logical tile set 300 for a logical resource (Block 504). The graphics processing unit 170 may default the logical tile set 300 to a null mapping (Block 506). The graphics processing unit 170 may access the primary physical tile pool 350 via a page table 222 to map the logical tile set 300 (Block 508). The graphics processing unit 170 may store a sparse data set referenced by the logical resource in the internal physical memory 220 (Block 510).

Figure 6:
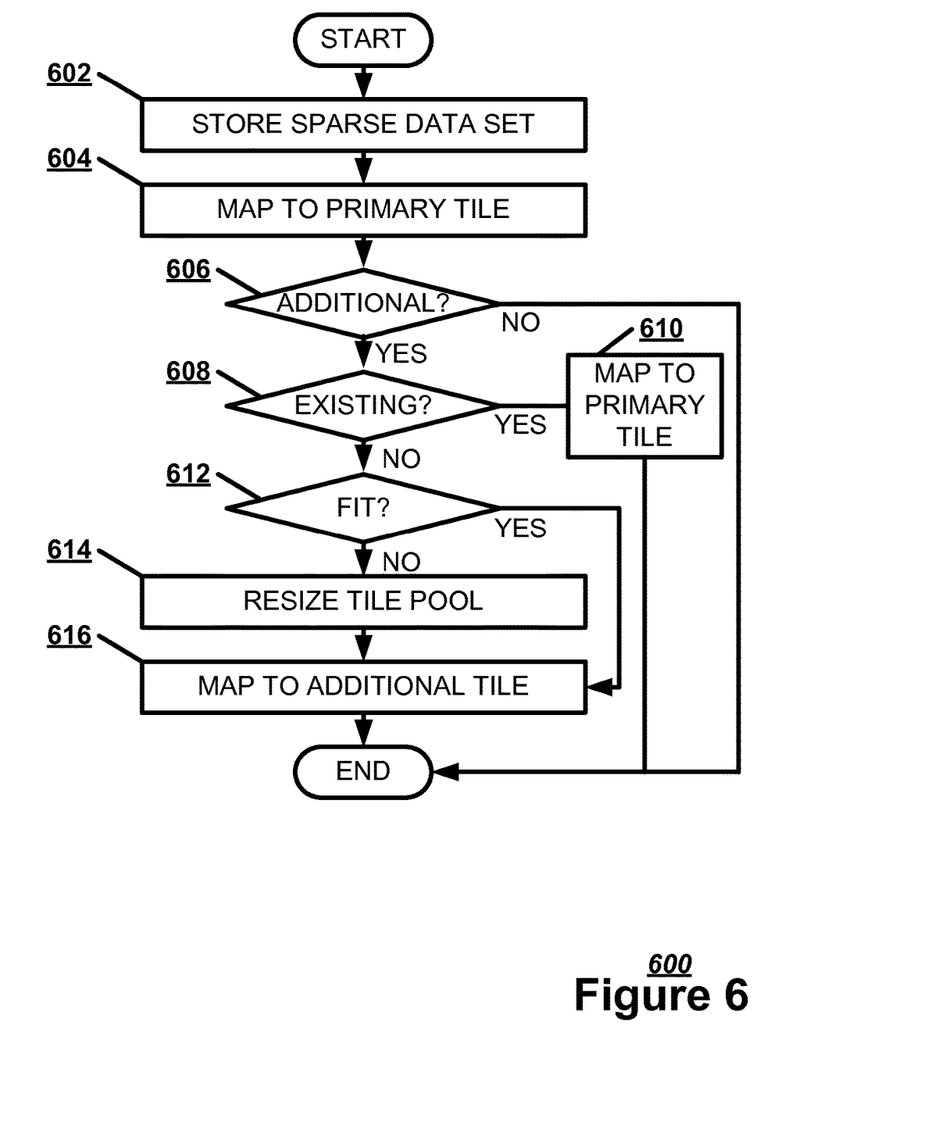
FIG. 6 illustrates, in a flowchart, one embodiment of a method of populating a resizable physical tile pool.

FIG. 6 illustrates, in a flowchart, one embodiment of a method 600 of populating a resizable physical tile pool. While FIG. 6 describes the mapping of a single logical tile 320 at a time, bulk mapping of logical tiles may be similarly executed. The graphics processing unit 170 may store a sparse data set referenced by the logical resource (Block 602). The graphics processing unit 170 may selectively map a primary logical tile 320 of the logical tile set 300 to a primary physical tile 360 of the primary physical tile pool 350 (Block 604). If an additional logical tile 320 is to be mapped (Block 606) and the data of the logical tile 320 is already stored in an existing physical tile 360 (Block 608), the graphics processing unit 170 may map the additional logical tile 320 of the logical tile set 300 to the primary physical tile 360 (Block 610). Otherwise, if no physical tile 360 is available in the primary physical tile pool 350 (Block 612), then the graphics processing unit 170 may resize the primary physical tile pool 350 (Block 614). The graphics processing unit 170 may increase the primary physical tile pool 350 in the resize by multiple physical tiles to provide headroom for future increases in the number of logical tiles mapped. The graphics processing unit 170 may map an additional logical tile 320 of the logical tile set 300 to an additional physical tile 360 of the primary physical tile pool 350 (Block 616).

Figure 7:
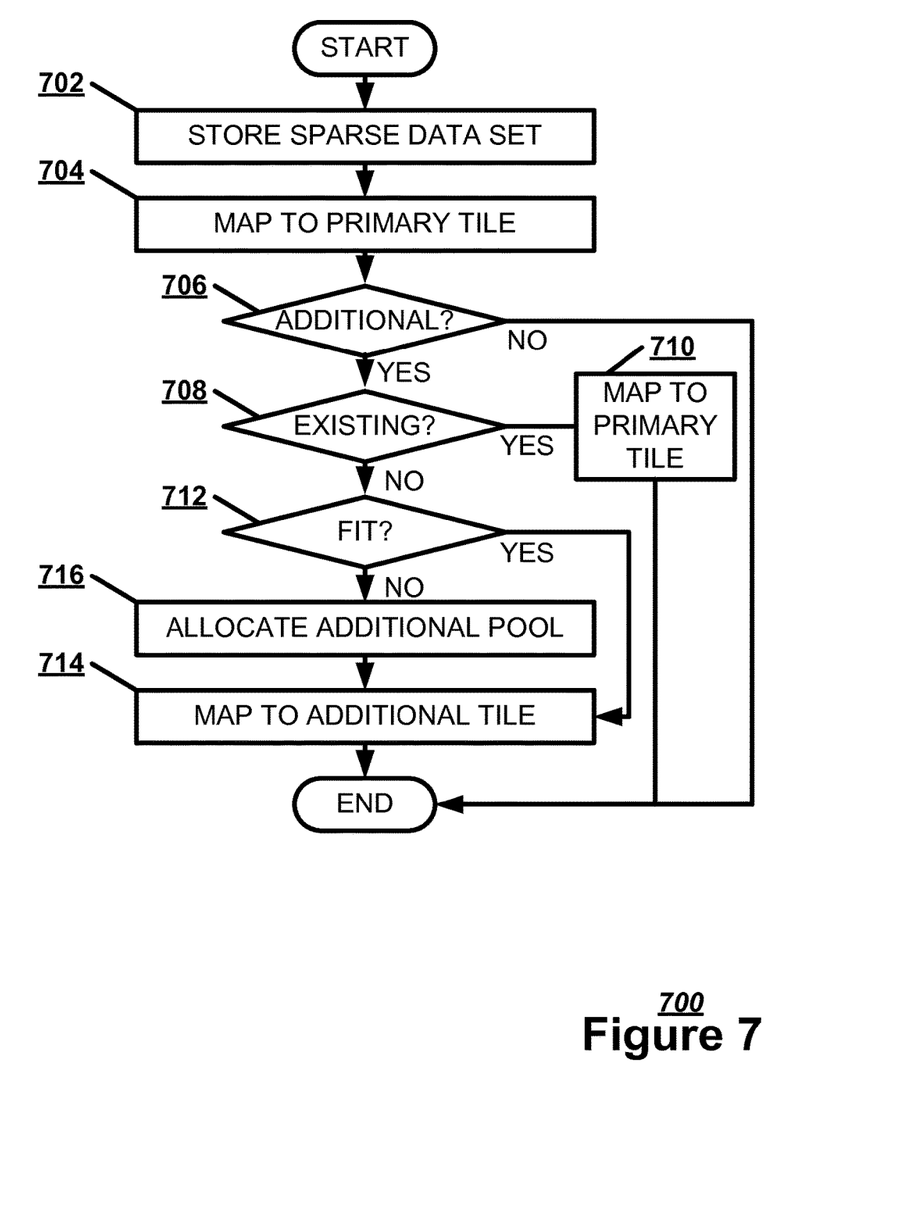
FIG. 7 illustrates, in a flowchart, one embodiment of a method of populating multiple physical tile pools.

FIG. 7 illustrates, in a flowchart, one embodiment of a method of populating a multiple physical tile pools. While FIG. 7 describes the mapping of a single logical tile 320 at a time, bulk mapping of logical tiles may be similarly executed. The graphics processing unit 170 may store a sparse data set referenced by the logical resource (Block 702). The graphics processing unit 170 may selectively map a primary logical tile 320 of the logical tile set 300 to a primary physical tile 360 of the primary physical tile pool 350 (Block 704). If an additional logical tile 320 is to be mapped (Block 706) and the data of the logical tile 320 is already stored in an existing physical tile 360 (Block 708), the graphics processing unit 170 may map the additional logical tile 320 of the logical tile set 300 to the primary physical tile 360 (Block 710). Otherwise, if a physical tile 360 is available in the primary physical tile pool 350 (Block 712), then the graphics processing unit 170 may map an additional logical tile 320 of the logical tile set 300 to an additional physical tile 360 of the primary physical tile pool 350 (Block 714). If no physical tile 360 is available in the primary physical tile pool 350 (Block 712), then the graphics processing unit may allocate an additional physical memory allocation into an additional physical tile pool 350 (Block 716). The graphics processing unit 170 may map an additional logical tile 320 of the logical tile set 300 to an additional physical tile 360 of the additional physical tile pool 350 (Block 714).

Figure 8:
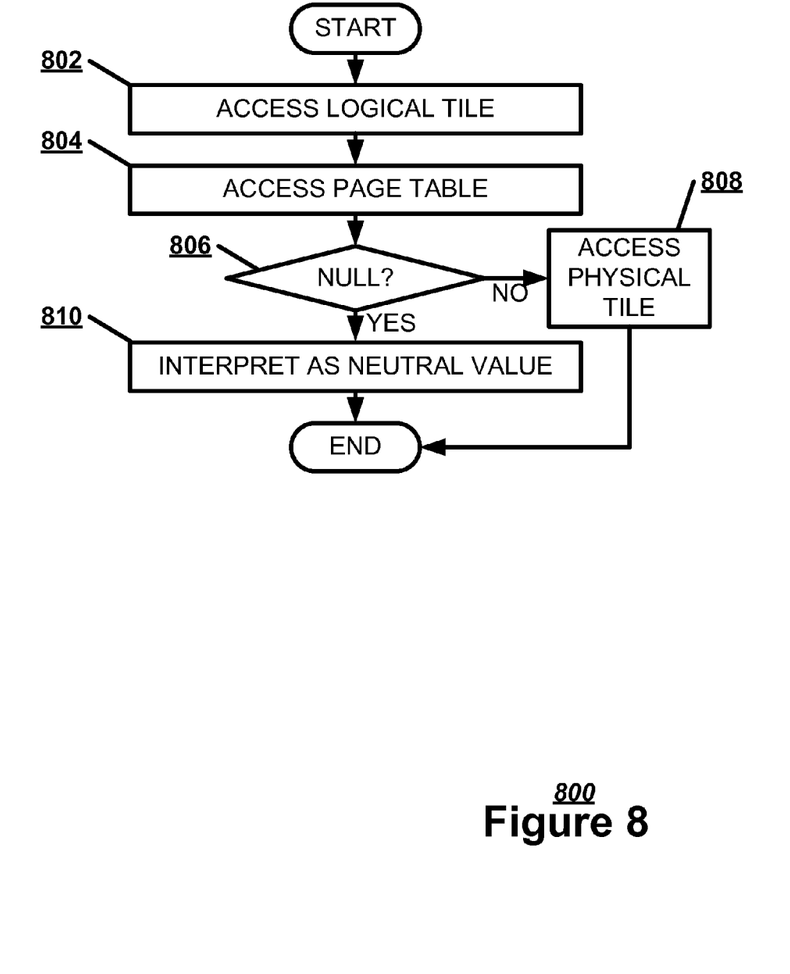
FIG. 8 illustrates, in a flowchart, one embodiment of a method of accessing a data set stored in a physical memory.

FIG. 8 illustrates, in a flowchart, one embodiment of a method 800 of accessing a data set stored in a logical resource. While FIG. 8 describes reading a single logical tile 320 at a time, bulk reading of logical tiles may be similarly executed. The graphics processing unit 170 may access a primary logical tile 320 determined in a logical mapping (Block 802). The graphics processing unit 170 may access a page table 222 to determine a primary physical tile 360 for the primary logical tile 320 (Block 804). If the primary logical tile 320 is mapped to a primary physical tile 360 (Block 806), the graphics processing unit 170 may use the primary logical tile 320 to access the primary physical tile 360 (Block 808). If the primary logical tile 320 is a null-mapped logical tile 410 (Block 806), the graphics processing unit 170 may interpret a null-mapped logical tile 410 in the logical tile set 300 as a neutral value (Block 810).

Figure 9:
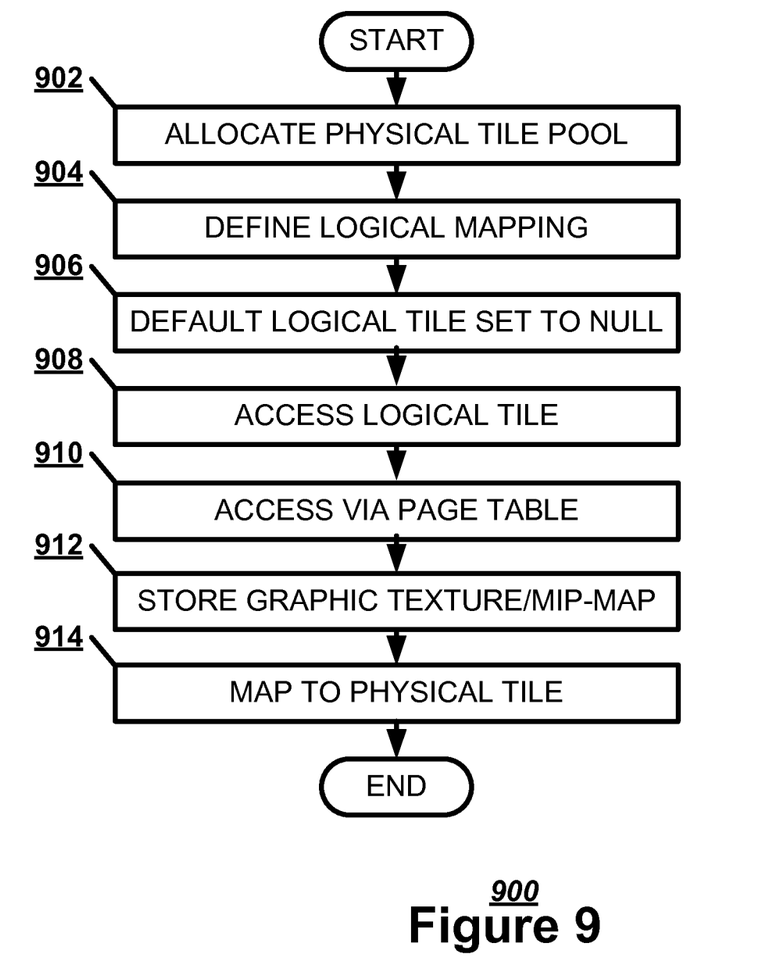
FIG. 9 illustrates, in a flowchart, one embodiment of a method of storing a graphic texture data set.

Selective mapping may be used to store a large sparse data set, such as a graphic texture data set. FIG. 9 illustrates, in a flowchart, one embodiment of a method of storing a graphic texture data set. The graphics processing unit 170 may allocate a physical memory allocation into a primary physical tile pool 350 (Block 902). The graphics processing unit 170 may define a logical mapping of a logical tile set 300 for a logical resource (Block 904). The graphics processing unit 170 may default the logical tile set 300 to a null mapping (Block 906). The graphics processing unit 170 may access a primary logical tile 320 determined in a logical mapping (Block 906). The graphics processing unit 170 may access the primary physical tile pool 350 via a page table 222 (Block 910). The graphics processing unit 170 may store a graphic texture data set referenced by the logical resource, such as a MIP-map graphic texture data set (Block 912). The graphics processing unit 170 may selectively map the primary logical tile 320 of the logical tile set 300 to a primary physical tile 360 of the primary physical tile pool 350 (Block 914).

Figure 10:
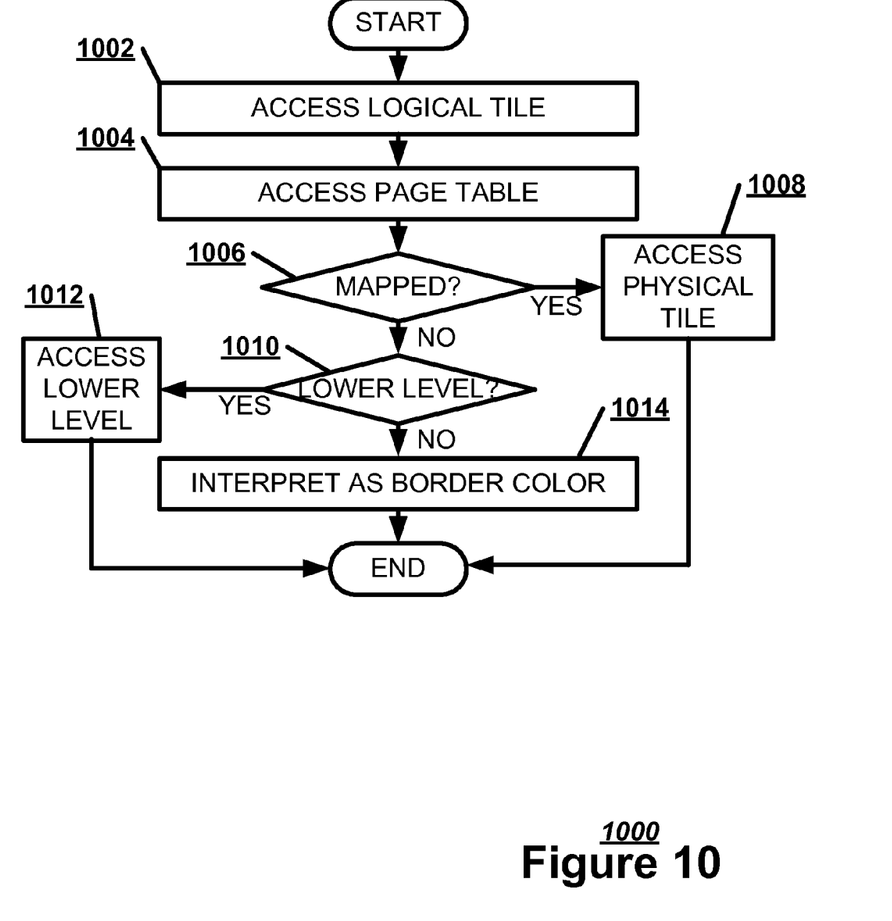
FIG. 10 illustrates, in a flowchart, one embodiment of a method of accessing a graphic texture data set stored in a physical memory to render a graphic texture.

FIG. 10 illustrates, in a flowchart, one embodiment of a method 1000 of accessing a graphic texture data set stored in a logical resource to render a graphic texture. While FIG. 10 describes reading a single logical tile 320 at a time, bulk reading of logical tiles may be similarly executed. The graphics processing unit 170 may access a primary logical tile 320 determined in a logical mapping (Block 1002). The graphics processing unit 170 may access a page table to determine a primary physical tile 360 for the primary logical tile 320 (Block 1004). If the logical tile 320 is mapped to a physical tile 360 (Block 1006), the graphics processing unit 170 may use the primary logical tile 320 to access the graphic texture data in the primary physical tile 360 (Block 1008). If the logical tile 320 is a null-mapped logical tile 410 (Block 1006) and a lower level MIP-map is available (Block 1010), the graphics processing unit 170 may access the lower level MIP-map (Block 1012). If no lower level MIP-map is available (Block 1010), the graphics processing unit 170 may interpret a null-mapped logical tile 410 in the logical tile set 300 as a border color (Block 1014).

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Embodiments within the scope of the present invention may also include computer-readable storage media for carrying or having computer-executable instructions or data structures stored thereon. Such computer-readable storage media may be any available media that can be accessed by a general purpose or special purpose computer. By way of example, and not limitation, such computer-readable storage media can comprise RAM, ROM, EEPROM, CD-ROM or other optical disk storage, magnetic disk storage or other magnetic data storages, or any other medium which can be used to carry or store desired program code means in the form of computer-executable instructions or data structures. Combinations of the above should also be included within the scope of the computer-readable storage media.

Embodiments may also be practiced in distributed computing environments where tasks are performed by local and remote processing devices that are linked (either by hardwired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments are part of the scope of the disclosure. For example, the principles of the disclosure may be applied to each individual user where each user may individually deploy such a system. This enables each user to utilize the benefits of the disclosure even if any one of a large number of possible applications do not use the functionality described herein. Multiple instances of electronic devices each may process the content in various possible ways. Implementations are not necessarily in one system used by all end users. Accordingly, the appended claims and their legal equivalents should only define the invention, rather than any specific examples given.

We claim:

1. A machine-implemented method, comprising:
    allocating a physical memory allocation into a primary physical tile pool acting as a software abstraction to enable programming of a page table on a graphics processing unit;
    defining a logical mapping for a logical tile set for a logical resource by dividing the logical resource into the logical tile set;
    mapping selectively a primary logical tile of the logical tile set to a primary physical tile of the primary physical tile pool to store a data set represented by the primary logical tile in the primary physical tile;
    determining whether a data set of the logical tile set is stored in an existing physical tile;
    mapping an additional logical tile of the logical tile set repetitive of the primary logical tile to the same data set stored in the primary physical tile based on a determination that the data set of the logical tile set is stored in the existing physical tile; and
    resizing the primary physical tile pool based on a determination that the data set of the logical tile set is not stored in the existing physical tile.

2. The method of claim 1, further comprising:
    interpreting a null-mapped logical tile in the logical tile set as a neutral value.

3. The method of claim 1, further comprising:
    allocating an additional physical memory allocation into an additional physical tile pool.

4. The method of claim 1, further comprising:
    mapping another logical tile of the logical tile set to an additional physical tile of an additional physical tile pool.

5. The method of claim 1, further comprising:
    accessing a lower level MIP-map for the primary logical tile when the primary logical tile is a null-mapped logical tile.

6. The method of claim 1, further comprising:
    storing a sparse data set referenced by the logical resource.

7. The method of claim 1, further comprising:
    storing a graphic texture data set referenced by the logical resource.

8. The method of claim 1, further comprising:
    storing a MIP-map graphic texture data set referenced by the logical resource.

9. A tangible machine-readable medium having a set of instructions detailing a method stored thereon that when executed by one or more processors cause the one or more processors to perform the method, the method comprising:
    allocating a physical memory allocation into a primary physical tile pool acting as a software abstraction to enable programming of a page table on a graphics processing unit;
    defining a logical mapping of a logical tile set for a logical resource by dividing the logical resource into the logical tile set;
    storing a graphic texture data set referenced by the logical resource;
    mapping selectively a primary logical tile of the logical tile set to a primary physical tile of the primary physical tile pool to store a data set represented by the primary logical tile in the primary physical tile;
    determining whether a data set of the logical tile set is stored in an existing physical tile;
    mapping an additional logical tile of the logical tile set repetitive of the primary logical tile to the same data set stored in the primary physical tile based on a determination that the data set of the logical tile set is stored in the existing physical tile; and
    resizing the primary physical tile pool based on a determination that the data set of the logical tile set is not stored in the existing physical tile.

10. The tangible machine-readable medium of claim 9, wherein the method further comprises:
    using the primary logical tile to access the primary physical tile.

11. The tangible machine-readable medium of claim 9, wherein the method further comprises:

interpreting a null-mapped logical tile in the logical tile set as a border color.

12. The tangible machine-readable medium of claim 9, wherein the method further comprises:
    accessing a lower level MIP-map if the primary logical tile is a null-mapped logical tile.

13. The tangible machine-readable medium of claim 9, wherein the method further comprises:
    allocating an additional physical memory allocation into an additional physical tile pool; and
    mapping another logical tile of the logical tile set to an additional physical tile of an additional physical tile pool.

14. A graphics processing unit, comprising:
    a processor configured to:
        allocate a physical memory allocation into a primary physical tile pool acting as a software abstraction to enable programming of a page table; and
        define a logical mapping for a logical tile set for a logical resource by dividing the logical resource into the logical tile set;
    an internal physical memory configured to store a graphic texture data set referenced by the logical resource; and
    a page table manager configured to:
        selectively map a primary logical tile of the logical tile set to a primary physical tile of the primary physical tile pool to store a part of a graphic text data set represented by the primary logical tile in the primary physical tile;
        determining whether a data set of the logical tile set is stored in an existing physical tile;
        selectively map an additional logical tile of the logical tile set repetitive of the primary logical tile to the same part of the graphic texture data set stored in the primary physical tile based on a determination that the data set of the logical tile set is stored in the existing physical tile; and
        resize the primary physical tile pool based on a determination that the data set of the logical tile set is not stored in the existing physical tile.

15. The graphics processing unit of claim 14, wherein the page table manager is configured to map another logical tile of the logical tile set to an additional physical tile of an additional physical tile pool.

16. The graphics processing unit of claim 14, wherein the page table manager is configured to default to a null mapping for the logical tile set.

17. The graphics processing unit of claim 14, wherein the processor is configured to interpret a null-mapped logical tile in the logical tile set as a border color.

* * * * *